(12) United States Patent
Baiyor et al.

(10) Patent No.: US 6,714,636 B1
(45) Date of Patent: Mar. 30, 2004

(54) APPARATUS, METHOD AND SYSTEM FOR SUBSCRIBER CONTROL OF TIMED AND REGIONAL MEMBERSHIP IN MULTIPLE MEMBER TERMINATION GROUPS FOR MULTIPLE LEG TELECOMMUNICATION SESSIONS

(75) Inventors: Robert John Baiyor, Naperville, IL (US); Deborah Thomas Earl, Naperville, IL (US); Harold Robert Smith, Jr., Oakbrook Terrace, IL (US); Thomas Dale Strom, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/404,901

(22) Filed: Sep. 24, 1999

(51) Int. Cl.[7] ................................................ H04M 3/42
(52) U.S. Cl. .......................... 379/211.04; 379/211.02; 455/456.01; 455/456.03
(58) Field of Search ........................ 379/211.01, 211.02, 379/211.04

(56) References Cited

U.S. PATENT DOCUMENTS

| | | | | |
|---|---|---|---|---|
| 5,206,901 A | * | 4/1993 | Harlow et al. | 379/207.07 |
| 5,276,731 A | * | 1/1994 | Arbel et al. | 379/211.02 |
| 5,724,411 A | * | 3/1998 | Eisdorfer et al. | 379/211.03 |
| 5,802,160 A | | 9/1998 | Kugell et al. | |
| 6,005,930 A | * | 12/1999 | Baiyor et al. | 379/196 |
| 6,009,159 A | * | 12/1999 | Baiyor et al. | 379/196 |
| 6,115,461 A | * | 9/2000 | Baiyor et al. | 379/211.02 |
| 6,366,660 B1 | * | 4/2002 | Baiyor et al. | 379/202.01 |
| 6,408,173 B1 | * | 6/2002 | Bertrand et al. | 455/405 |

* cited by examiner

Primary Examiner—Ahmad F. Matar
Assistant Examiner—Rasha S AL-Aubaidi

(57) ABSTRACT

A system, apparatus and method are provided for subscriber control of timed and regional membership in multiple member termination groups for multiple leg telecommunication sessions, such as for providing outgoing call legs for a flexible alerting service, to different groups of members, at different times of day or different geographic locations. The preferred system includes a home location register coupled to a mobile switching center. The home location register has, stored in a memory, a plurality of secondary directory numbers associated with a primary directory number, and includes instructions to determine whether each secondary directory number, of the plurality of secondary directory numbers, is currently incorporated within a selected alerting group based upon a predefined time period parameter or a geographic location parameter for a mobile unit corresponding to the secondary directory number. The mobile switching center has an interface for receiving an incoming call leg designating the primary directory number and for differentially processing and routing each outgoing call leg associated with each secondary directory number currently incorporated within the selected alerting group.

38 Claims, 5 Drawing Sheets

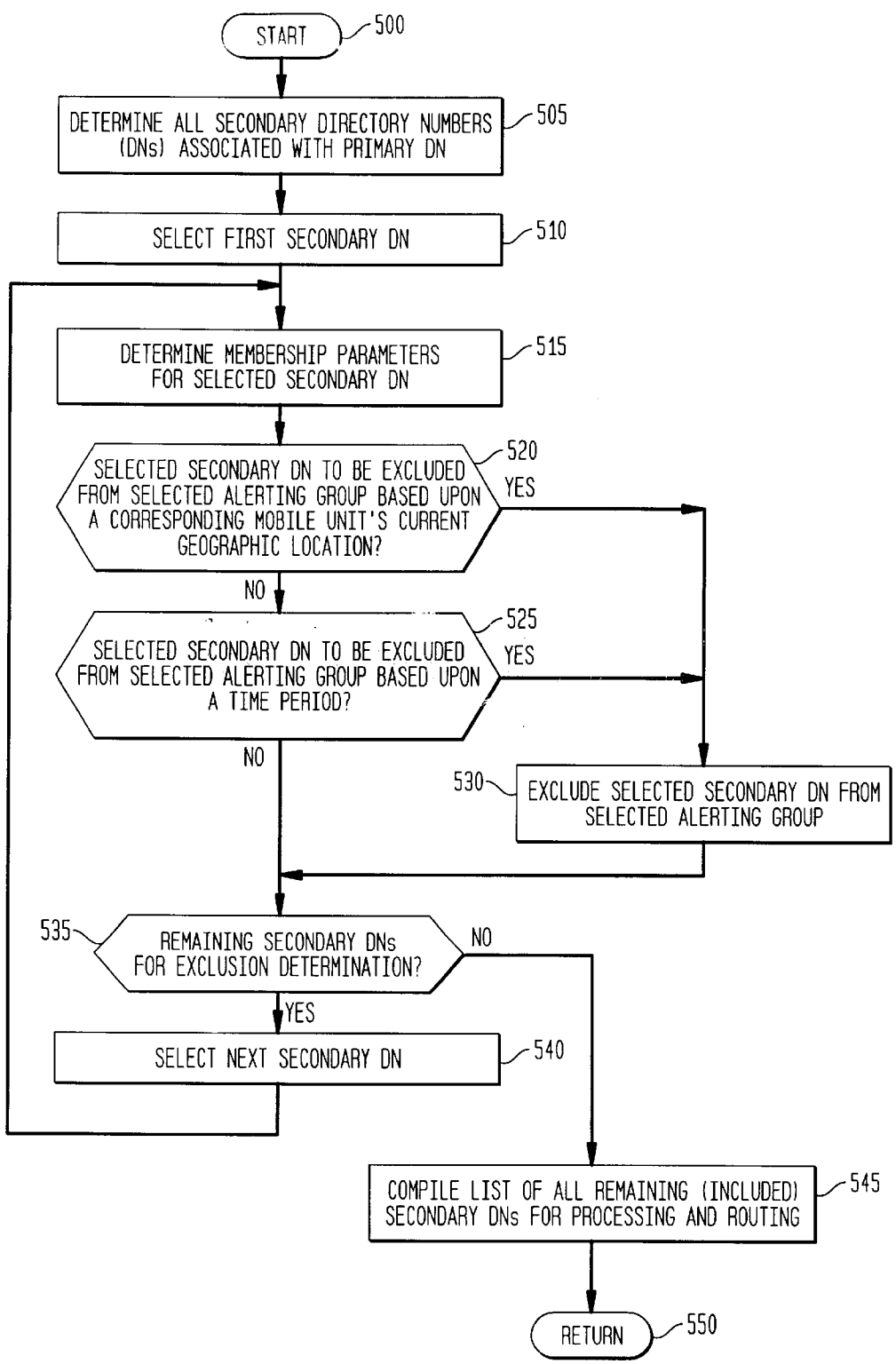

APPARATUS, METHOD AND SYSTEM FOR SUBSCRIBER CONTROL OF TIMED AND REGIONAL MEMBERSHIP IN MULTIPLE MEMBER TERMINATION GROUPS FOR MULTIPLE LEG TELECOMMUNICATION SESSIONS

CROSS-REFERENCE TO RELATED APPLICATIONS

This application is related to Baiyor et al., U.S. patent application Ser. No. 09/094,837, now U.S. Pat. No. 6,009,159, which issued on Dec. 28, 1999, entitled "Apparatus, Method And System For Controlling The Start Of Alerting Of Multiple Leg Telecommunication Sessions", filed Jun. 15, 1998, commonly assigned to Lucent Technologies, Inc., and incorporated by reference herein, with priority claimed for all commonly disclosed subject matter (the "first related application").

This application is related to Baiyor et al., U.S. patent application Ser. No. 09/097,334, now U.S. Pat. No. 6,005,930 which issued on Dec. 21, 1999, entitled "Apparatus, Method And System For Controlling Secondary Treatment By a Distant Switch Of Multiple Leg Telecommunication Sessions", filed Jun. 15, 1998, commonly assigned to Lucent Technologies, Inc., and incorporated by reference herein, with priority claimed for all commonly disclosed subject matter (the "second related application").

This application is related to Baiyor et al., U.S. patent application Ser. No. 09/097,527, now U.S. Pat. No. 6,115,461 which issued on Sep. 5, 2000, entitled "Apparatus, Method And System For Providing Information To A Called Party In Multiple Leg Telecommunication Sessions", filed Jun. 15, 1998, commonly assigned to Lucent Technologies, Inc., and incorporated by reference herein, with priority claimed for all commonly disclosed subject matter (the "third related application").

This application is related to Baiyor et al., U.S. patent application Ser. No. 09/342,499, now U.S. Pat. No. 6,366,660 B1 which issued on Apr. 2, 2002, entitled "Apparatus, Method And System For Providing Variable Alerting Patterns For Multiple Leg Telecommunication Sessions", filed Jun. 29, 1999, commonly assigned to Lucent Technologies, Inc., and incorporated by reference herein, with priority claimed for all commonly disclosed subject matter (the "fourth related application").

This application is related to Baiyor et al., U.S. patent application Ser. No. 09/350,577, entitled "Apparatus, Method And System For Providing Call Progress Information For Multiple Leg Telecommunication Sessions For Intelligent Network Services", filed Jul. 9, 1999, commonly assigned to Lucent Technologies, Inc., and incorporated by reference herein, with priority claimed for all commonly disclosed subject matter (the "fifth related application").

This application is related to Baiyor et al., U.S. patent application Ser. No. 09/350,439, now U.S. Pat. No. 6,445,915 B1 which issued on Sep. 3, 2002, entitled "Apparatus, Method And System For Providing Variable Termination Patterns For Multiple Leg Telecommnunication Sessions", filed Jul. 9, 1999, commonly assigned to Lucent Technologies, Inc., and incorporated by reference herein, with priority claimed for all commonly disclosed subject matter (the "sixth related application").

FIELD OF THE INVENTION

The present invention relates in general to telecommunication systems, and more particularly, to an apparatus, method and system for providing subscriber control of timed and regional membership in multiple member termination groups for multiple leg telecommunication sessions.

BACKGROUND OF THE INVENTION

With the advent of increasingly sophisticated telecommunication services, various proposals have been made to allow a single call, incoming to a telecommunication switch, to branch into multiple, independent outgoing calls (or legs) to different called parties, during the same period of time. These incoming and multiple outgoing calls may be wireline, such as PSTN (public switched telephone network), ISDN (integrated services digital network), or T1/E1 wireline calls, or may be wireless, such as cellular calls or other mobile service communications.

Once such proposal is included in the ANSI-41 specification promulgated by the American National Standards Institute for wireless telecommunication, such as cellular communication, and is referred to as "flexible alerting". Within ANSI-41, an incoming call may designate a pilot or primary directory number ("DN"), which is then branched into multiple, outgoing call legs to the parties or members of a predefined group, referred to as a flexible alerting group. The ANSI-41 flexible alerting specification, however, does not include any specific directions or guidelines for implementation and control of such independent outgoing multiple leg calls.

More specifically, the ANSI-41 specification does not provide for any significant control, by a subscriber, concerning if and when the subscriber and other members of the flexible alerting group are to receive one or more of the outgoing call legs, at any particular time and in any particular location. Rather, the ANSI-41 specification provides merely for inclusion or exclusion of the particular member(s) within the flexible alerting group, i.e., a given member is either in or out of the flexible alerting group. When the given member is in the flexible alerting group, that given member will receive outgoing call legs at all times; when the given member is not in the flexible alerting group, that given member will not receive any outgoing call legs, also at all times.

As a consequence, a need remains for an apparatus, method and system to provide subscriber control over the reception of one or more outgoing call legs during particular periods of time and while located within particular geographic regions. Such subscriber control should preferably be interactive, with the capability for the subscriber to determine if, when and where the subscriber is to receive one or more outgoing call legs for a flexible alerting group. In addition, such control should allow for activation and deactivation on a regular or periodic basis, such as for particular times of day, days of the week, and time intervals, and allow for activation and deactivation on a geographic or regional basis, such as for activation when the subscriber is located within a local area and deactivation when the subscriber has roamed to another geographic region.

SUMMARY OF THE INVENTION

In accordance with the present invention, an apparatus, method and system are illustrated which provide subscriber control of timed and regional membership, in multiple member termination groups for multiple leg telecommunication sessions. The various embodiments of the present invention provide for subscriber control of which members of a flexible alerting group are to be alerted during any given time period and when located within any particular geographic region. Moreover, the apparatus, method and system of the present invention are user friendly and provide such subscriber control on an interactive basis, such as through a telephone keypad or computer graphical user interface. Another significant feature of the present invention is that such subscriber control is provided in real time and on a dynamic basis, to be responsive to changing environmental and user conditions which may arise in wireless or wireline communication systems.

A preferred system embodiment, for subscriber control of membership in a multiple member termination group for a multiple leg telecommunication session, includes a database, such as a home location register, and a switching center, such as a mobile switching center. The database has, stored in a memory, a plurality of secondary directory numbers associated with a primary directory number, and further storing various parameters for each such secondary directory numbers, such as time period and geographic location parameters, in addition to routing and answering parameters. In addition, the database includes instructions to determine whether each secondary directory number, of the plurality of secondary directory numbers, is currently incorporated within a selected alerting group. For example, a variety of subsets of the entire alerting group may be formed for different times of day, days of the week, or geographic locations of mobile units (corresponding to particular secondary directory numbers). The switching center includes an interface for receiving an incoming call leg designating the primary directory number, and for differentially processing and routing each outgoing call leg associated with each secondary directory number currently incorporated within the selected alerting group.

In the various system embodiments, the database includes further instructions to determine whether each secondary directory number, of the plurality of secondary directory numbers, is currently incorporated within a selected alerting group based upon: first, a predefined time period parameter, such as a selected time of day, a selected day of a week, or a selected holiday; or second, a geographic location of a mobile unit corresponding to the secondary directory number.

Within the preferred system, various methodologies may be utilized to determine which secondary numbers are incorporated within the selected alerting group. Utilizing an exclusion methodology, the database may include further instructions to initially include all of the secondary directory numbers of the plurality of secondary directory numbers to form an initial alerting group; to determine whether each secondary directory number, of the plurality of secondary directory numbers, is excluded from the initial alerting group based upon time period or geographic location parameters; and to form the selected alerting group as a remainder subset of secondary directory numbers of the initial alerting group following exclusion determination. Alternatively, utilizing an inclusion methodology, no initial alerting group is determined, and the database includes further instructions to determine whether each secondary directory number, of the plurality of secondary directory numbers, is included within the selected alerting group based upon time period and geographic location parameters.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 5 is a flow diagram illustrating a method to provide subscriber control of timed and regional membership in multiple member termination groups in accordance with the present invention.

DETAILED DESCRIPTION OF THE INVENTION

Figure 1A:
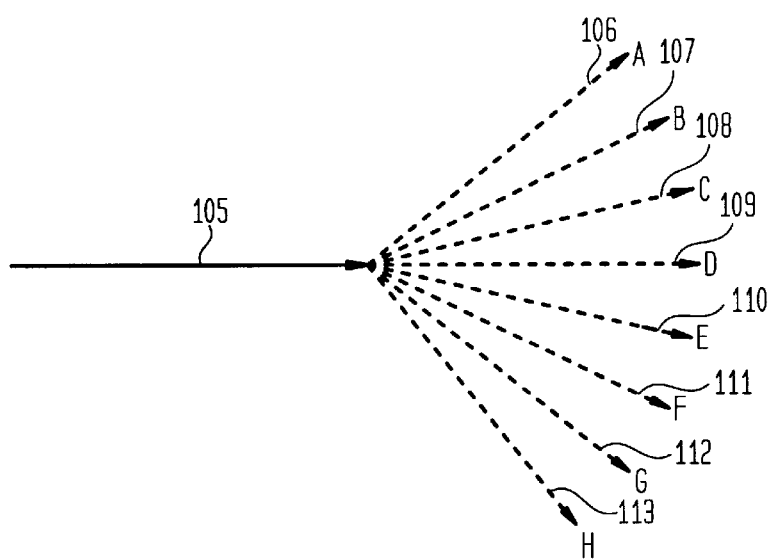
FIG. 1A is a graphical diagram illustrating a first exemplary scheme for alerting of multiple outgoing communication sessions in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

In accordance with the present invention, an apparatus, method and system are illustrated which provide subscriber control of timed and regional membership, in multiple member termination groups for multiple leg telecommunication sessions. The various embodiments of the present invention provide for subscriber control of which members of a flexible alerting group are to be alerted during any given time period and when located within any particular geographic region. The apparatus, method and system of the present invention are user friendly and provide such subscriber control on an interactive basis, such as through a telephone keypad, internet or web-based interactivity or other computer graphical user interface. In addition, such subscriber control is provided in real time and on a dynamic basis, to be responsive to changing environmental and user conditions which may arise in wireless or wireline communication systems.

As mentioned above, the new ANSI-41 specification provides a communications standard for flexible alerting for wireless communications, as a terminating feature or terminating call service. In this specification, a call is placed to a special directory number ("DN") referred to as a pilot directory number ("pilot DN") or as a primary directory number ("primary DN"). A subscriber or other user of flexible alerting or other multi-leg communications typically predefines a group of other directory numbers, referred to herein as secondary DNs, which are to be associated with the pilot or primary DN, such that when a call is placed to the primary DN, all of the secondary directory numbers are alerted. Such a list or grouping may be referred to as a flexible alerting group, or more broadly as an alerting group or a secondary DN group, (and may also be referred to as a termination group or list when incorporated in certain response messages discussed below). In addition, each secondary DN of the group may also be referred to as a member of the group, and in accordance with the present invention, such membership may be varied dynamically by the subscriber.

An incoming call to the pilot DN is processed by a mobile switch, which then directs the incoming call to the multiple different mobile or wireline secondary DNs of the user's predefined alerting group, creating multiple different outgoing communication legs to these differing and independent directory numbers. Whichever outgoing call leg is first to answer will receive the call and be connected to the calling party, with the other call legs released (i.e., dropped or torn down, with their corresponding alerting ceased).

Such flexible alerting or other multi-leg communication may be useful, for example, in businesses involving sales, repairs, or dispatching services. For example, a customer may call a single primary DN, which will then alert mobile telephones at all associated secondary directory numbers within a flexible alerting group for a repair service. The first member to answer an outgoing call leg will be connected to and receive the customer call, and the answering member, for example, may then directly proceed to the customer location to perform the requested repairs.

Such flexible alerting may also be useful for other business and personal uses, such as multiple calls to a home, office, and cellular telephone. For example, a child may call a single DN, namely, a parent's pilot DN, which will then alert the telephones at all the associated directory numbers or lines defined in the parent's alerting group or list, such as their home DN, business office DN, home office DN, and cellular or other mobile telephone DN. Presuming the parent is present, the parent will be alerted at any and all of these locations from the placement of a single telephone call.

As mentioned above, however, the ANSI-41 specification does not provide for dynamic control, by the subscriber, of their inclusion within a flexible alerting group, during any particular time period or while located within any particular geographic region. Such dynamic subscriber control is provided, in accordance with the present invention, for inclusion or exclusion of members (secondary DNs) based upon both time periods and regional locations. For example, the subscriber may provide that certain secondary directory numbers will be alerted at certain times of day and/or days of the week, such as alerting the home office DN and business office DN from 9 a.m. to 5 p.m. Monday through Friday, while alerting the home DN and cellular DN only from 5 p.m. to 10 p.m. Monday through Friday and 9 a.m. to 10 p.m. on weekends, while alerting none of these particular DNs from 10 p.m. to 9 a.m. every day of the week. In addition, however, at other times or during the same time periods, also for example, other secondary DNs may be alerted, such as DNs for members of the flexible alerting group who are "on call", or for those members working evening, night, or weekend shifts.

In addition, in accordance with the present invention, subscriber control is provided based upon the geographic region in which a mobile unit may be located at any given time. For example, for a repair or dispatching service, the subscriber may determine that any mobile units that have traveled out of a home region and have roamed into another region may be too far away to answer service requests in a timely fashion. As a consequence, the subscriber may provide that those mobile units will not be alerted when they are located in other geographic regions.

FIG. 1A is a graphical diagram illustrating a first, exemplary flexible alerting scheme, as controlled by a subscriber, for alerting of multiple outgoing communication sessions, in accordance with the present invention. As illustrated in FIG. 1A, an incoming call leg 105, designating a pilot DN (or other primary DN), is processed by a switch to generate multiple outgoing call legs to a flexible alerting group of eight secondary DNs A–H: outgoing call leg 106 to secondary DN "A"; outgoing call leg 107 to secondary DN "B"; outgoing call leg 108 to secondary DN "C"; outgoing call leg 109 to secondary DN "D"; outgoing call leg 110 to secondary DN "E"; outgoing call leg 111 to secondary DN "F"; outgoing call leg 112 to secondary DN "G"; and outgoing call leg 113 to secondary DN "H". Such a scheme may be selected by the subscriber, for example, during business hours and for mobile units traveling within their home or central geographic region of operation.

Figure 1B:
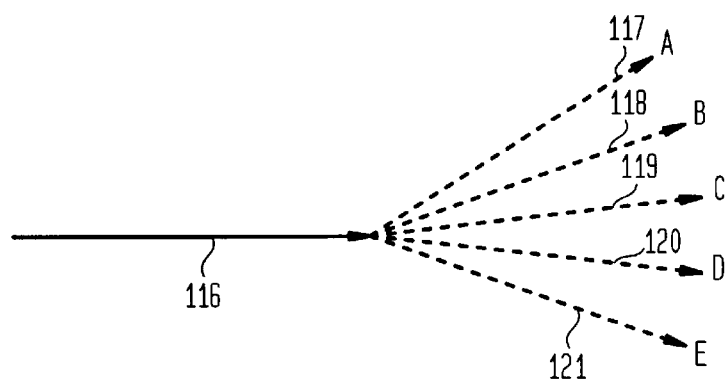
FIG. 1B is a graphical diagram illustrating a second exemplary scheme for alerting of multiple outgoing communication sessions, for a different time period or different geographic region than the alerting illustrated in FIG. 1A, in accordance with the present inventions.

FIG. 1B is a graphical diagram illustrating a second, exemplary flexible alerting scheme, as controlled by a subscriber, for alerting of multiple outgoing communication sessions in accordance with the present invention, for a different time period or different geographic region than the alerting illustrated in FIG. 1A. As illustrated in FIG. 1B, a second incoming call leg 116 designating the same primary (pilot) DN is processed by the switch, to generate the multiple outgoing call legs to only some of the members of the same flexible alerting group of secondary DNs, namely, to only five members A–E: outgoing call leg 117 to secondary DN "A"; outgoing call leg 118 to secondary DN "B"; outgoing call leg 119 to secondary DN "C"; outgoing call leg 120 to secondary DN "D"; and outgoing call leg 121 to secondary DN "E".

Figure 1C:
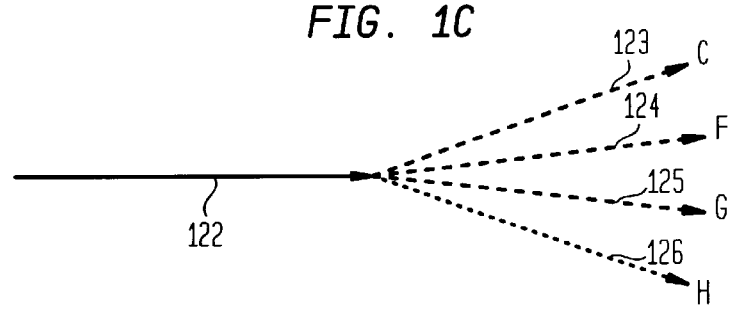
FIG. 1C is a graphical diagram illustrating a third exemplary scheme for alerting of multiple outgoing communication sessions, for a different time period or different geographic region than the alerting illustrated in FIGS. 1A and 1B, in accordance with the present invention.

FIG. 1C is a graphical diagram illustrating a third, exemplary flexible alerting scheme, as controlled by a subscriber, for alerting of multiple outgoing communication sessions in accordance with the present invention, for a different time period or different geographic region than the alerting illustrated in FIGS. 1A and 1B. As illustrated in FIG. 1C, a third incoming call leg 122 designating the same primary (pilot) DN is processed by the switch, to generate the multiple outgoing call legs to another different subset of the members of the same flexible alerting group of secondary DNs, namely, only to four members C, F, G and H: outgoing call leg 123 to secondary DN "C"; outgoing call leg 124 to secondary DN "F"; outgoing call leg 125 to secondary DN "G"; and outgoing call leg 126 to secondary DN "H".

The alerting schemes of FIGS. 1A, 1B and 1C may be implemented by a switch and controlled through subscriber input into a database (as discussed in detail below). Such subscriber control may be utilized for a wide variety of reasons. For example, for FIG. 1B, members (secondary DNs) F, G and H may have roamed outside of a specified geographic region, and in accordance with the subscriber's specifications, will not be alerted, as these members may be unable to respond timely to customer requests. Also for example, the subscriber may have determined that only members A through E are to be alerted, and members F, G and H are not to be alerted, during certain time periods, such as from 5 p.m. through 12 a.m., as these members are unavailable at those times (also FIG. 1B). Similarly, at other times, such as for a weekend "on call", the subscriber may have determined that only members C, F, G and H are to be alerted, as illustrated in FIG. 1C.

As illustrated in FIGS. 1A, 1B and 1C, the current membership (or, equivalently and correspondingly, the current termination pattern) of the flexible alerting group has been dynamically varied, in real time, based upon subscriber input and control in accordance with the present invention, for the various flexible alerting sessions. This subscriber control of membership in accordance with the present invention, determining which members of a flexible alerting group will or will not be alerted, at any given time or within any given geographic region, may provide the subscriber with a more efficient utilization of resources and corresponding greater customer satisfaction. For example, such control allows a subscriber to dynamically tailor the membership of any given flexible alerting group for maximal responsiveness, according to the particular needs or objectives of that particular flexible alerting group.

As discussed in greater detail below, in the preferred embodiment, this subscriber control of timed and geographic membership in a flexible alerting group is implemented interactively, such as through a menu with a voice or keypad response program, through a graphical user interface, or through another service provider interface. Such subscriber control may be implemented directly within a system of the present invention, through entry and storage of this information within a database, both upon initial establishment of the flexible alerting group, and as possibly revised subsequently by the subscriber.

After initial establishment of the flexible alerting group with corresponding time period and geographic location specifications for each member (generally referred to herein as membership parameters), these various membership parameters may be changed through subscriber interaction with the database (in addition to direct subscriber contact with the service provider, such as via telephone or in person). Such subscriber interaction with the database may be accomplished directly, through keypad or voice entry of subscriber specifications or preferences, such as through a wireless telephone (mobile unit) or through a wireline telephone. Such subscriber interaction with the database also may be accomplished indirectly, such as through a computer (and modem) data connection to the database, such as via the internet or another type of network data communication.

Figure 2:
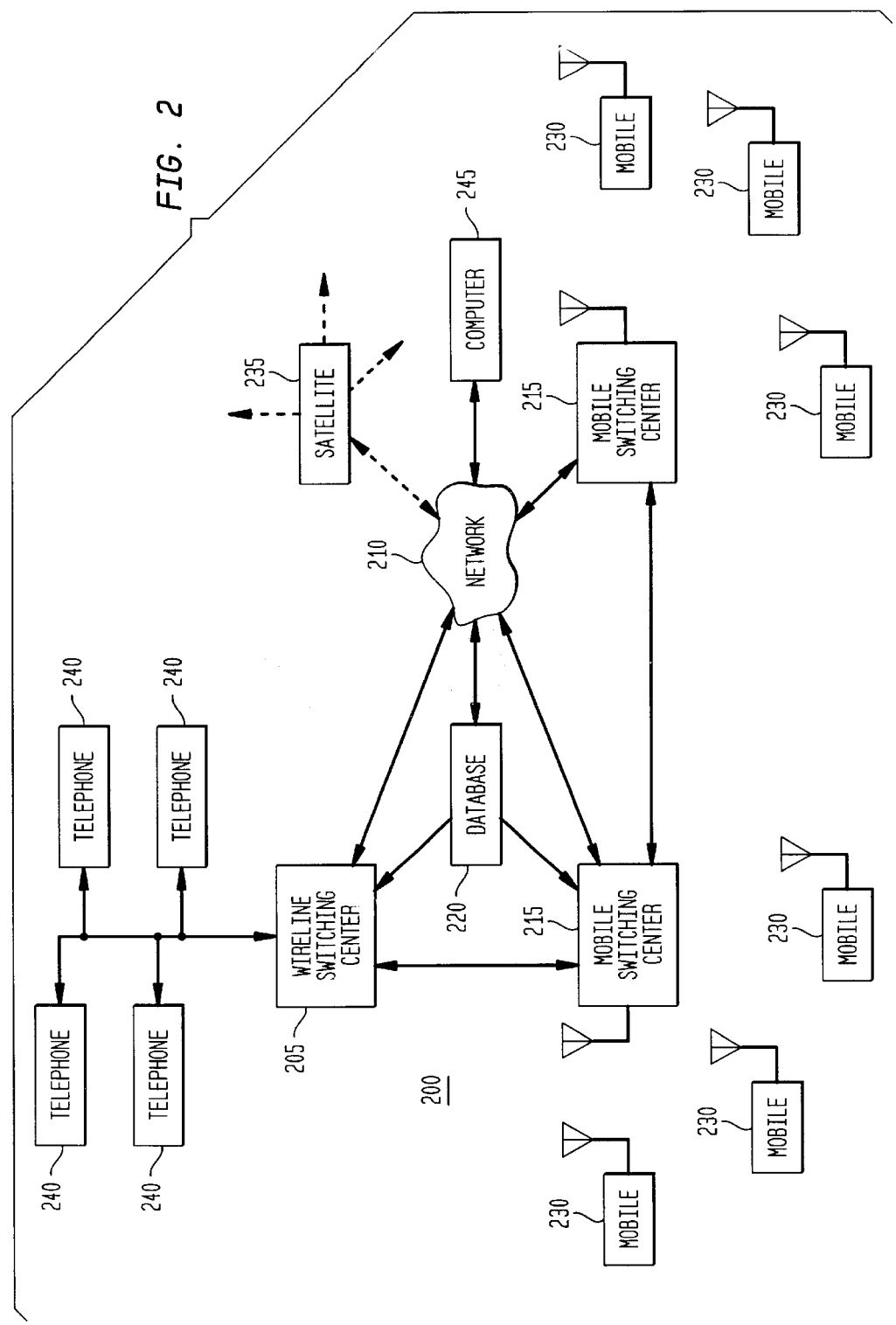
FIG. 2 is a block diagram illustrating a first system embodiment in accordance with the present invention.

FIG. 2 is a block diagram illustrating a first system embodiment 200 in accordance with the present invention. The system 200 includes one or more mobile switching centers ("MSCs") 215 and one or more wireline switching centers 205, which may also be connected via trunk and signaling lines to each other and to a broader network 210, such as a PSTN or ISDN network providing multiple telecommunication connections to other locations, such as providing a link to satellite 235. The system 200 also includes a database 220, which is preferably connected or coupled to a wireline switching center 205 and to a MSC 215. A database 220 may also be directly included or integrated within the various switching centers 205 and 215. The system 200 may also have a network (such as internet) connection to a computer 245 (or other network communication device), to provide the subscriber interactivity mentioned above.

The wireline switching center 205 is also generally connected to a plurality of telephones 240 or other customer premise equipment, while the MSCs 215 (via base stations or other wireless transceivers, not separately illustrated) typically have a wireless link to the various mobile units 230, such as cellular telephones within a particular geographic region, for voice and data communication and for the subscriber interactivity mentioned above. In addition, while the wireline and mobile switching centers 205 and 215 are usually physically separated due to regulatory and other historical reasons, these switching centers may also be combined into one or more switching centers having both wireline and wireless functionalities.

Continuing to refer to FIG. 2, an incoming call directed to a primary DN may be received by either the wireline switching center 205 or one of the mobile switching centers 215. The switching center 205 or 215 then transmits a request to database 220 for an alerting list containing the secondary directory numbers associated with the primary or pilot DN (such as a termination list). In accordance with the present invention, based upon the subscriber specifications of timed and regional membership parameters for each secondary DN of the alerting group, the database 220 determines whether a particular secondary DN is currently to be alerted (i.e., currently included within the flexible alerting group), and selects all of the secondary DNs which are to be included and alerted for the given time (or time period) and geographic location. An exemplary flow diagram for such inclusion (or exclusion) determinations by the database 220 is illustrated in FIG. 5.

The database 220 then transmits a response to the corresponding switching center 205 or 215, containing or listing these selected, associated DNs. (In accordance with the related inventions, the response also includes each of their corresponding routing and answering parameters (one set of parameters for each associated DN), such as each of their timing delay parameters (ring start adjustment time ("RSAT") values), no answer time parameters (NAT values), and no answer termination trigger parameters). A significant feature of the present invention, and a significant departure from the ANSI-41 specification, is that this response containing a listing of secondary DNs (such as a termination list) is variable, based upon time periods and geographic locations, according to the subscriber's membership parameters.

The switching center 205 or 215 then begins the processing and routing of the associated outgoing call legs to the selected membership (or selected membership subset) of secondary DNs. In accordance with the related inventions, such processing and routing of each outgoing call leg delayed according to its corresponding timing delay parameter, and unless one of the call legs is answered, with each such outgoing call leg allowed to be alerted according to its no answer time parameter, followed by release according to its no answer termination trigger parameter.

In accordance with the present invention, the database 220 maintains time period and geographic location specifications, as membership parameters, for each secondary DN of each alerting group. As indicated above, these membership parameters may be established initially, and subsequently may also be varied based upon subscriber input, directly via links with telephones 240 or mobile units 230, such as through an interactive menu and response program or direct contact with the service provider, or indirectly through network 210 via a data link with a computer 245, such as through a graphical user interface.

Figure 3:
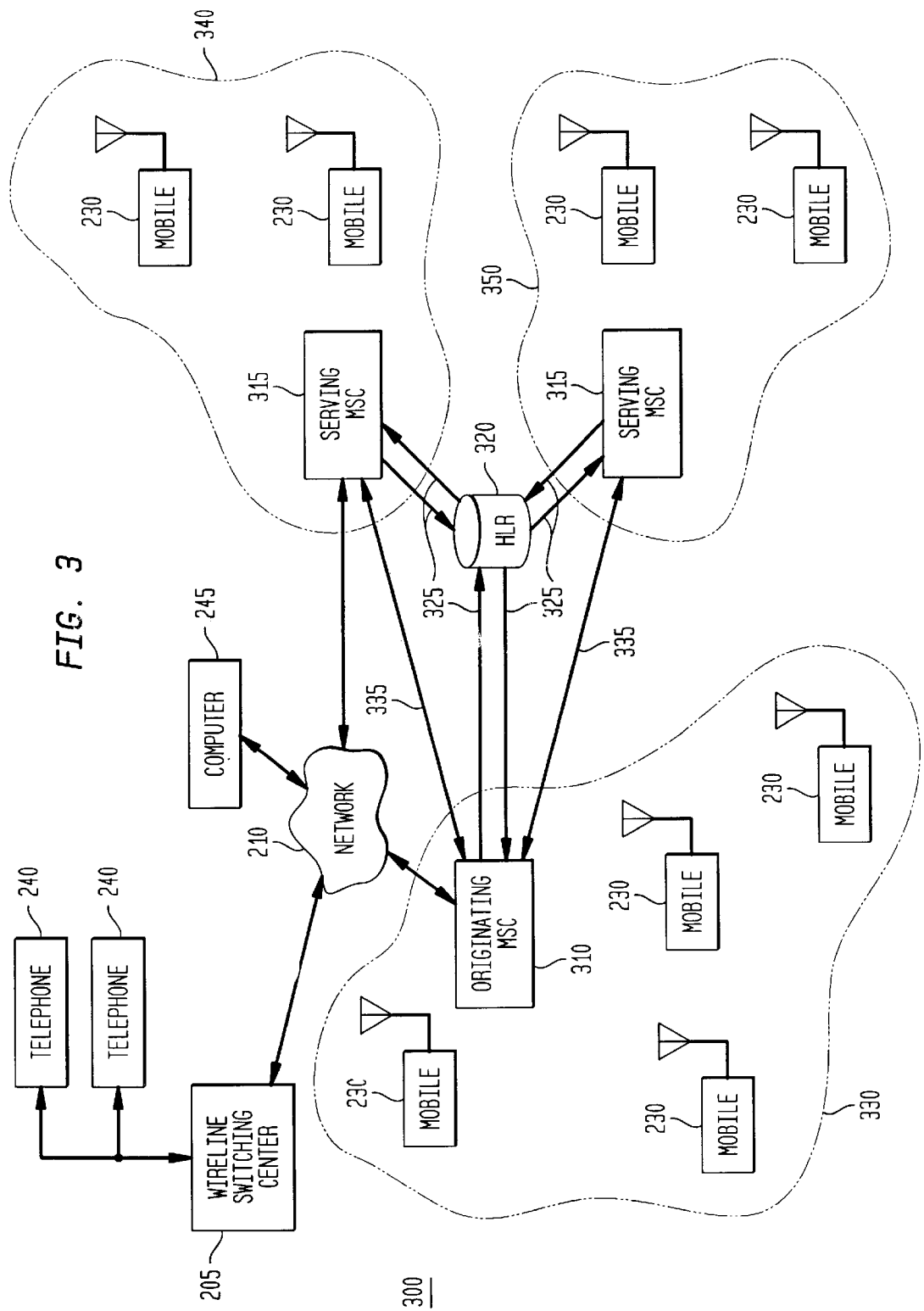
FIG. 3 is a block diagram illustrating a second system embodiment for wireless communication in accordance with the present invention.

FIG. 3 is a block diagram illustrating a second, preferred system embodiment 300 for wireless communication in accordance with the present invention, such as for ANSI-41 flexible alerting. In this system 300, the mobile switching centers 215 are represented by two types of MSCs. The first type of MSC, referred to as an incoming call or originating MSC 310, directly provides service to the mobile units 230 within its designated or predetermined geographic region 330. The second type of MSC, referred to as a serving MSCs 315, provides service to mobile units 230 which have traveled or roamed into their designated or predetermined geographic regions 340 and 350. A stand-alone home location register ("HLR") 320 is utilized in this preferred embodiment, among other things, to implement the database 220 and other ANSI-41 signaling functionality. The various MSCs 310 and 315 are preferably connected to the HLR 320 via ANSI-41 signaling interfaces and corresponding links 325. As in the system of FIG. 2, the various MSCs 310 and 315 are also connected or coupled to a wireline switching center 205 and to a network 210, for multiple network connections, such as PSTN, ISDN, or satellite connections. Also as in the system of FIG. 2, the various telephones 240 and mobile units 230, or computer 245, may be utilized for subscriber input of specifications for timed and regional membership parameters for a given flexible alerting group.

As indicated above, a user or subscriber typically initially defines their alerting group of secondary telephone numbers (or other directory numbers), and also initially defines and may subsequently vary membership parameters for each such secondary DN. These secondary DNs are those numbers that the subscriber would like alerted when their pilot or other primary DN is called. In accordance with the present invention, based upon timed and regional membership parameters, such alerting groups or termination lists may be dynamically varied, in real time. Such secondary DNs included in a user defined alerting group or termination list may also be divided into different groupings or sets based upon their potentially differing routing requirements. For example, the wireless and wireline groupings may be utilized, along with subsets of these groupings, such as wireless DNs served by MSCs other than the originating MSC 310. In accordance with the invention disclosed in the first related application, four types of exemplary routing groups or situations are utilized, with their corresponding timing delay parameters for providing concurrent alerting: group 1, wireline DNs, which may be located locally, regionally, nationally or internationally; group 2, wireless DNs in a location served by the originating MSC 310; group 3, wireless DNs in a location served by a serving MSC 315; and group 4, wireless DNs served from a location in which its data or other information is located on a different HLR, i.e., on an HLR other than HLR 320.

Continuing to refer to FIG. 3, when an originating MSC 310 receives an incoming call to or otherwise designating a pilot DN or other primary directory number, the originating MSC 310 transmits a query or other message to an HLR 320, typically in the form of a data packet. While the operation of the system 300 is explained with reference to an originating MSC 310, it should be understood that any MSC 215, at any given time, may be serving as either or both an originating MSC 310 or a serving MSC 315. The incoming call to the originating MSC 310 may be a wireless call, from one of the mobile units 230, or may be a wireline call originating from the network 210, such as a PSTN call. In the preferred embodiment, utilizing the ANSI-41 specification, the query transmitted by the originating MSC 310 to the HLR 320 is a "LocationRequest", which is an operation used by an originating MSC 310 to obtain call treatment instructions from the HLR 320, and is initiated with a "TCAP INVOKE (LAST), carried by a TCAP QUERY WITH PERMISSION package, and includes corresponding mandatory and optional parameters as defined in the ANSI-41 specification for a LocationRequest INVOKE, such as pilot DN, billing identification, and originating MSC identifier.

Utilizing its stored information (e.g., database), the HLR 320 first determines whether the pilot or primary DN is for a flexible alerting group or other multi-leg communications group, and if so, prepares a response or other message containing or listing the secondary DNs (of the user's or subscriber's defined alerting group) which are to be alerted. In accordance with the present invention, based upon the subscriber's specifications of timed and regional membership parameters for each secondary DN within the alerting group, the grouping or subset of secondary DNs included within the response may be varied at any given time (or time period) and for any given location (of the various mobile units 230). In addition, as disclosed in the related applications, the response further contains, for each selected secondary DN which is to be alerted, their corresponding routing and answering parameters, such as RSAT values, NAT values, and termination triggers. The HLR 320 then transmits, back to the originating MSC 310, a response data packet having a listing of secondary DNs, selected in accordance with the membership parameters, with each of their corresponding routing and answering parameters (RSAT values, NAT values, and termination triggers). In the preferred embodiment, for the response data packet, the variable subset or listing of secondary DNs is provided within a TerminationList of an ANSI-41 compatible LocationRequest RETURN RESULT.

Additional processing is typically required for situations in which wireless secondary DNs are in a geographical location served by a serving MSC 315, such as regions 340 or 350 illustrated in FIG. 3. As mobile units 230 power on, a signal is typically transmitted between the mobile unit 230 and the MSC serving the geographic region in which the mobile unit is located, which may be an originating MSC 310 or a serving MSC 315, which signal indicates that the mobile unit 230 is within that service region. In addition, when an originating MSC 310 receives a call for one of its mobile units 230, it typically transmits a request (or page) to that mobile unit 230 to verify its location prior to allocating its resources (such as a wireless channel) and connecting the wireless call. As these various mobile units 230 travel and roam out of the geographic region 330 served by its originating (or "home") MSC 330, and move into regions 340 or 350 served by other MSCs referred to as the serving MSCs 315, the mobile units 230 and the serving MSCs 315 also exchange such location information. For any given call, the serving MSC 315 assigns each such roaming mobile unit 230 a temporary local directory number ("TLDN") for use within its serving geographic region 340 or 350. The serving MSC 315 also transmits this location information to the HLR 320. The HLR 320 maintains and logs this information as each such mobile unit 230 may roam in and out of the various geographic regions, such as regions 330, 340 and 350, and stores such information by typically updating a memory pointer designating the particular serving MSC 315 corresponding to the secondary DN of the roaming mobile unit 230.

As a consequence, when the HLR 320 receives a query from an originating MSC 310 concerning an alerting group corresponding to a primary DN, such as an ANSI-41 LocationRequest, the HLR 320 may have information indicating that a particular mobile unit 230 of the alerting group is or was last known to be in a region 340 or 350 of a serving MSC 315. Depending upon the subscriber's specification of geographic (and timed) membership parameters, the particular roaming mobile unit 230 may or may not be currently included within the alerting group. When the roaming mobile unit 230 is to be currently included within the membership of the alerting group, the HLR 320 then transmits a routing request to the serving MSC 315 for the particular roaming mobile unit 230 (having the corresponding secondary DN of the alerting group), such as an ANSI-41 RoutingRequest INVOKE, requesting a TLDN to correspond to the particular roaming mobile unit 230. The serving MSC 315 assigns such a TLDN to the particular roaming mobile unit 230, and transmits this TLDN information to the HLR 320, such as in an ANSI-41 RoutingRequest RETURN RESULT data packet. This TLDN information (instead or in lieu of a secondary DN) is then included in the location response data package transmitted by the HLR 320 to the originating MSC 310, as mentioned above, with a corresponding routing and answering parameters (RSAT, NAT and termination triggers). As the originating MSC 310 processes and routes the outgoing call legs to the selected secondary DNs of the alerting group with their corresponding timing delays, the originating MSC 310 waits the predetermined period of time designated by the corresponding timing delay parameter (if any), and then processes and routes the outgoing call leg to the particular roaming mobile unit 230 utilizing its TLDN. Such a call may be routed from the originating MSC 310 to the serving MSC 315 through either a direct signaling and trunk connection 335, if it exists, or may be routed through the network 210, such as the PSTN.

The originating MSC 310, utilizing the information contained in the response data packet (the listing of selected secondary DNs or TLDNs and each of their corresponding routing and answering parameters), begins the processing and routing of each outgoing call leg to each secondary DN, in accordance with the related inventions, with: (1) such processing and routing delayed (if at all) according to each secondary DN's respective timing delay parameter; (2) alerted for the duration of its no answer time parameter, unless an outgoing call leg has been previously answered; and (3) released or otherwise treated according to its no answer termination trigger, also unless another outgoing call leg has been previously answered. If and when one of these outgoing call legs is answered, the originating MSC 310 connects the calling party (incoming leg) to that answered outgoing leg, followed by releasing the remaining outgoing legs and ceasing their alerting.

In the preferred embodiment, such a variable response packet is transmitted by the database 220 (or HLR 320) to a switch, such as an MSC 215 (or MSC 310 or 315). The ANSI-41 specification, however, does not provide for such dynamic variation in termination lists contained within the response packet (LocationRequest RETURN RESULT). The present invention, departing from the ANSI-41 specification, provides for dynamic modification, in real time, of which of the various secondary DNs are participating within the flexible alerting group at any given time and location, based upon subscriber specifications of timed and geographic membership parameters, with corresponding variation of the listing of secondary DNs returned from the database 220 (or HLR 320) to the switch (wireline switching center 205, mobile switching center 215, or originating MSC 310).

Figure 4:
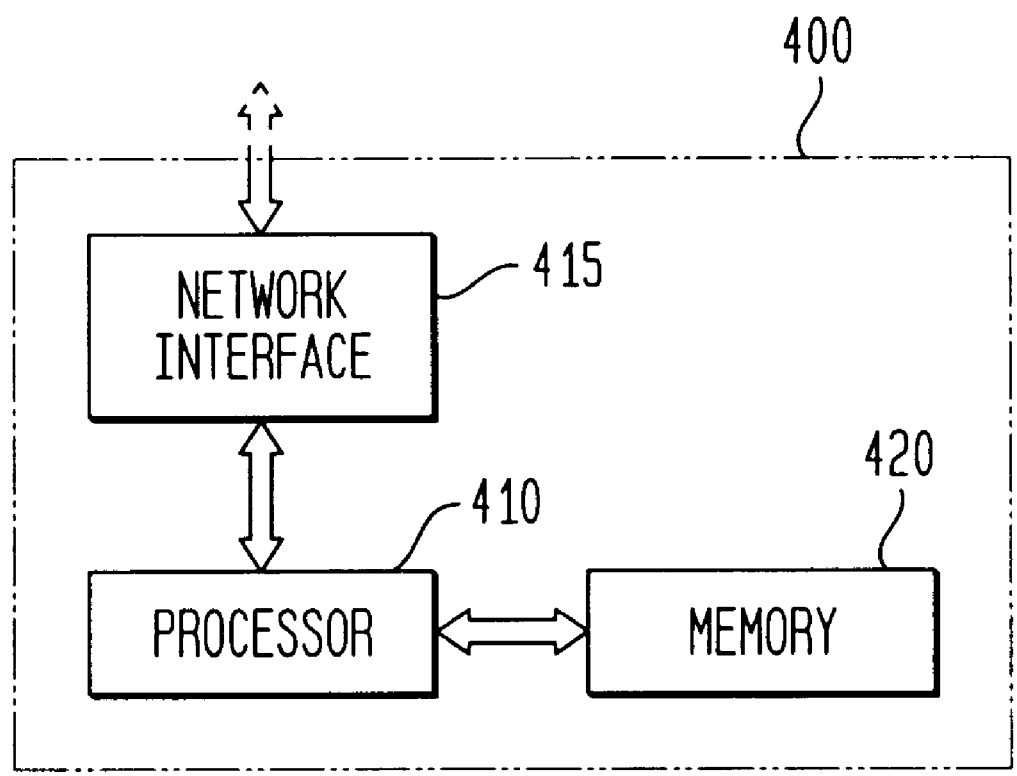
FIG. 4 is a block diagram illustrating an apparatus embodiment in accordance with the present invention.

FIG. 4 is a block diagram illustrating an apparatus embodiment 400 in accordance with the present invention. Such an apparatus 400 preferably may be included within a database 220 or HLR 320, or alternatively may be distributed among an MSC (310 or 315) and HLR 320 of a system 300, or distributed among a switching center 205 or 215 and database 220 of system 200. The apparatus 400 includes a processor 410, a network interface 415, and a memory 420. The network interface 415 is utilized to receive and transmit messages, such as to receive a location request or query, and to transmit a response message containing a variable listing of secondary DNs. The memory 420 may be a magnetic hard drive, an optical storage device, or any other type of data storage apparatus. The memory 420 is used to store information pertaining to primary DNs, such as all associated secondary DNs and their membership parameters, routing and answering parameters, other call placement and routing information, and the call progress information of the related inventions. The memory 420 performs such information storage comparable to the information storage of the database 220 or HLR 320.

Continuing to refer to FIG. 4, the processor 410 may include a single integrated circuit ("IC"), or may include a plurality of integrated circuits or other components connected, arranged or grouped together, such as microprocessors, digital signal processors ("DSPs"), application specific integrated circuits ("ASICs"), associated memory (such as RAM and ROM), and other ICs and components. As a consequence, as used herein, the term processor should be understood to equivalently mean and include a single processor, or arrangement of processors, microprocessors, controllers, or some other grouping of integrated circuits which perform the functions discussed above and also discussed in detail below with reference to FIG. 5, with associated memory, such as microprocessor memory or additional RAM, ROM, EPROM or E$^2$PROM. The methodology of the invention, as discussed above with reference to FIGS. 1–3 and as discussed below with reference to FIG. 5, may be programmed and stored, in the processor 410 with its associated memory and other equivalent components, as a set of program instructions for subsequent execution when the processor 410 is operative (i.e., powered on and functioning).

As mentioned above, in addition to incorporation within a database 220 or HLR 320, such an apparatus 400 may be included within, or distributed among, an MSC (310 or 315) or HLR 320 of a system 300, or may be included within, or distributed among, switching centers 205 or 215 and database 220 of system 200. For example, when included within the system 200, the various switching centers 205 and 215 may incorporate the database 220; in that event, the apparatus 400 may be completely included within either the wireline switching center 205 or the wireless switching center 215. Also for example, when included within the system 300, the apparatus 400 may distributed among the originating MSC 310 and the HLR 320, with the memory 420 incorporated within the HLR 320, with the processor 410 having components within the originating MSC 310 and the HLR 320, and with the network interface 415 incorporated within the MSC 310 (or 315).

FIG. 5 is a flow diagram illustrating a preferred method to provide subscriber control of timed and regional membership in multiple member termination groups in accordance with the present invention. As mentioned above, in the preferred embodiment, this method is carried out within a database 220 of system 200 or HLR 320 of system 300, or within an apparatus 400 (which may be included within a database 220 or HLR 320 or otherwise distributed within one of the systems 200 or 300). As discussed in greater detail below, the subscriber control of the flow diagram of FIG. 5 is implemented by initially including all members of a given flexible alerting group and then potentially excluding various secondary DNs, based upon their membership parameters, from the currently utilized alerting group. Conversely, it will be appreciated by those skilled in the art that an equivalent methodology may be performed by beginning with potentially no members of a given flexible alerting group and then including the various secondary DNs within the alerting group based upon the same membership parameters.

It should also be understood that the method of providing subscriber control of timed and regional membership of the present invention is in addition to, and not in lieu of, other membership determinations for multiple member termination groups. As disclosed in the fifth and sixth related applications, for example, termination groups may be varied based upon call progress information. In addition, the ANSI-41 protocol also defines a capability for a subscriber to deactivate their membership, which may take precedence over the timed and geographic exclusions of the method illustrated in FIG. 5. As a consequence, the methodology of the present invention may be adapted for and utilized in conjunction with other membership determinations for multiple member termination groups.

Referring to FIG. 5, beginning with start step 500, the method determines all secondary DNs associated with a primary DN, step 505. In the preferred embodiment, step 505 occurs within the database 220 (or HLR 320) following its receipt of a location request or query specifying the primary DN, transmitted by a switch (MSC 215 or 310) which had received an incoming call leg designating the primary DN. Of the complete group or set of all associated secondary DNs, the method then selects a first secondary DN, step 510, and determines the membership parameters for this selected secondary DN, step 515, preferably by accessing a memory 420 which stores membership, routing and answering parameters for each secondary DN of the alerting group.

For the given, selected secondary DN, the method then determines whether the secondary DN is to be currently excluded from the alerting group (and consequently not alerted) based upon the current geographic location of the corresponding mobile unit, step 520. When the selected secondary DN is to be currently excluded from the alerting group based upon the geographic location of the corresponding mobile unit in step 520, the method proceeds to step 530 and excludes the secondary DN from the current (or selected) alerting group or selected alerting group subset. When the selected secondary DN is not to be excluded from the alerting group on the basis of a geographic location membership parameter in step 520, the method proceeds to step 525, to determine whether the selected secondary DN is to be currently excluded from the alerting group (and not alerted) based upon a time period membership parameter. When the selected secondary DN is to be currently excluded from the alerting group based upon a time period membership parameter in step 525, the method also proceeds to step 530 and excludes the secondary DN from the current (or selected) alerting group. When the selected secondary DN is not to be currently excluded based upon geographic location (step 520) or time period (step 525) membership parameters, that selected secondary DN, by default in the preferred method embodiment, remains included within the alerting group (alerting group subset), discussed in greater detail below with reference to method step 545.

Following the determinations of steps 520, 525 (and 530), the method proceeds to determine whether there are any remaining associated secondary DNs of the entire alerting group which require an exclusion (or inclusion) determination, step 535. When there are remaining secondary DNs requiring such determinations, the method selects another or next secondary DN, step 540, and returns to step 515 to determine its membership parameters and perform the exclusion determinations of steps 520 and 525. When all secondary DNs of the alerting group have been so evaluated in steps 520 and 525, with those to be currently excluded from the alerting group based on membership parameters having been so excluded in step 530, the method proceeds to step 545, and compiles a listing of all remaining (included) secondary DNs (with their various parameters) for subsequent processing and routing. As mentioned above, such a listing is preferably included in a response message transmitted from a database 220 (or HLR 320) to a switch (such as MSC 215 or 310) for this subsequent processing and routing. Following such compilation or listing of secondary DNs to be currently included within the alerting group in step 545, the method may end, return step 550.

Numerous advantages of the present invention may be apparent from the discussion above. First, in accordance with the present invention, an apparatus, method and system are illustrated which provide subscriber control of timed and regional membership, in multiple member termination groups for multiple leg telecommunication sessions. The various embodiments of the present invention provide for subscriber control of which members of a flexible alerting group are to be alerted during any given time period and when located within any particular geographic region. Second, the apparatus, method and system of the present invention are user friendly and provide such subscriber control on an interactive basis, such as through a telephone keypad or computer graphical user interface. Lastly, such subscriber control is provided in real time and on a dynamic basis, to be responsive to changing environmental and user conditions which may arise in wireless or wireline communication systems.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for subscriber control of membership in a multiple member termination group for a multiple leg telecommunication session, the method comprising:
   (a) receiving an incoming call leg designating a primary directory number,
   (b) determining a plurality of secondary directory numbers associated with the primary directory number;
   (c) determine whether each secondary directory number, of the plurality of secondary directory numbers, is currently incorporated within a selected alerting group based upon a determination of a geographic location of a mobile unit corresponding to the secondary directory number; and
   (d) differentially processing and routing each outgoing call leg associated with each secondary directory number currently incorporated within the selected alerting group.

2. The method of claim 1, wherein determining step (c) further comprises:
   determining whether each secondary directory number, of the plurality of secondary directory numbers, is currently incorporated within a selected alerting group based upon a predefined time period parameter and a current time.

3. The method of claim 2, wherein the predefined time period parameter is a selected time of day.

4. The method of claim 2, wherein the predefined time period parameter is a selected day of a week.

5. The method of claim 2, wherein the predefined time period parameter is a selected holiday.

6. The method of claim 1, wherein the selected alerting group is a subset of an alerting group comprising all of the secondary directory numbers of the plurality of secondary directory numbers associated with the primary directory number.

7. The method of claim 1, wherein determining step (c) further comprises:
- (c1) initially including all of the secondary directory numbers of the plurality of secondary directory numbers to form an initial alerting group;
- (c2) determining whether each secondary directory number, of the plurality of secondary directory numbers, is excluded from the initial alerting group based upon time period or geographic location parameters; and
- (c3) forming the selected alerting group as a remainder subset of secondary directory numbers of the initial alerting group following exclusion determination.

8. The method of claim 1, wherein determining step (c) further comprises:
determining whether each secondary directory number, of the plurality of secondary directory numbers, is included within the selected alerting group based upon time period and geographic location parameters.

9. The method of claim 1, wherein step (d) further comprises:
transmitting a message containing, for each secondary directory number of the selected alerting group, corresponding routing and answering parameters.

10. A system for subscriber control of membership in a multiple member termination group for a multiple leg telecommunication session, the system comprising:
- a database having stored in a memory a plurality of secondary directory numbers associated with a primary directory number, wherein the database includes instructions to determine whether each secondary directory number, of the plurality of secondary directory numbers, is currently incorporated within a selected alerting group based upon a geographic location of a mobile unit corresponding to the secondary directory number; and,
- a switching center coupled to the database, the switching center further having an interface for receiving an incoming call leg designating the primary directory number and for differentially processing and routing each outgoing call leg associated with each secondary directory number currently incorporated within the selected alerting group.

11. The system of claim 10, wherein the database includes further instructions to determine whether each secondary directory number, of the plurality of secondary directory numbers, is currently incorporated within a selected alerting group based upon a predefined time period parameter and a measurement of a current time.

12. The system of claim 11, wherein the predefined time period parameter is a selected time of day.

13. The system of claim 11, wherein the predefined time period parameter is a selected day of a week.

14. The system of claim 11, wherein the predefined time period parameter is a selected holiday.

15. The system of claim 10, wherein the database includes further instructions to determine the selected alerting group as a subset of an alerting group comprising all of the secondary directory numbers of the plurality of secondary directory numbers associated with the primary directory number.

16. The system of claim 10, wherein the database includes further instructions to initially include all of the secondary directory numbers of the plurality of secondary directory numbers to form an initial alerting group; to determine whether each secondary directory number, of the plurality of secondary directory numbers, is excluded from the initial alerting group based upon time period or geographic location parameters; and to form the selected alerting group as a remainder subset of secondary directory numbers of the initial alerting group following exclusion determination.

17. The system of claim 10, wherein the database includes further instructions to determine whether each secondary directory number, of the plurality of secondary directory numbers, is included within the selected alerting group based upon time period and geographic location parameters.

18. The system of claim 10, wherein the database includes further instructions to transmit a message to the switching center, the message containing a listing of each secondary directory number of the selected alerting group and corresponding routing and answering parameters for each secondary directory number of the selected alerting group.

19. The system of claim 10, wherein the database is a home location register.

20. The system of claim 10, wherein the switching center is a mobile switching center.

21. An apparatus for subscriber control of membership in a multiple member termination group for a multiple leg telecommunication session, the apparatus comprising:
- a network interface for reception of an incoming call leg designating a primary directory number and for transmission of an outgoing call leg;
- a memory having a plurality of secondary directory numbers associated with the primary directory number; and
- a processor coupled to the memory and the network interface, wherein the processor, when operative, includes program instructions to determine whether each secondary directory number, of the plurality of secondary directory numbers, is currently incorporated within a selected alerting group based upon a determination of a geographic location of a mobile unit corresponding to the secondary director number, and to differentially process and route each outgoing call leg associated with each secondary directory number of the selected alerting group.

22. The apparatus of claim 21, wherein the processor includes further instructions to determine whether each secondary directory number, of the plurality of secondary directory numbers, is currently incorporated within a selected alerting group based upon a predefined time period parameter and a determination of a current time.

23. The apparatus of claim 22, wherein the predefined time period parameter is a selected time of day.

24. The apparatus of claim 22, wherein the predefined time period parameter is a selected day of a week.

25. The apparatus of claim 22, wherein the predefined time period parameter is a selected holiday.

26. The apparatus of claim 21 wherein the processor includes further instructions to determine the selected alerting group as a subset of an alerting group comprising all of the secondary directory numbers of the plurality of secondary directory numbers associated with the primary directory number.

27. The apparatus of claim 21 wherein the processor includes further instructions to initially including all of the secondary directory numbers of the plurality of secondary directory numbers to form an initial alerting group; to determine whether each secondary directory number, of the plurality of secondary directory numbers, is excluded from the initial alerting group based upon time period or geographic location parameters; and to form the selected alerting group as a remainder subset of secondary directory numbers of the initial alerting group following exclusion determination.

28. The apparatus of claim 21 wherein the processor includes further instructions to determine whether each secondary directory number, of the plurality of secondary directory numbers, is included within the selected alerting group based upon time period and geographic location parameters.

29. A system for subscriber control of membership in a multiple member termination group for a multiple leg telecommunication session, the system comprising:
   a home location register having stored in a memory a plurality of secondary directory numbers associated with a primary directory number, wherein the home location register includes instructions to determine whether each secondary directory number, of the plurality of secondary directory numbers, is currently incorporated within a selected alerting group based upon a geographic location parameter for a mobile unit corresponding to the secondary directory number; and
   a mobile switching center coupled to the home location register, the mobile switching center further having an interface for receiving an incoming call leg designating the primary directory number and for differentially processing and routing each outgoing call leg associated with each secondary directory number currently incorporated within the selected alerting group.

30. The system of claim 29, wherein the predefined time period parameter is a selected time of day, a selected day of a week, or a selected holiday.

31. The system of claim 29 wherein the home location register includes further instructions to initially including all of the secondary directory numbers of the plurality of secondary directory numbers to form an initial alerting group; to determine whether each secondary directory number, of the plurality of secondary directory numbers, is excluded from the initial alerting group based upon the predefined time period or geographic location parameters; and to form the selected alerting group as a remainder subset of secondary directory numbers of the initial alerting group following exclusion determination.

32. The system of claim 29 wherein the home location register includes further instructions to determine whether each secondary directory number, of the plurality of secondary directory numbers, is included within the selected alerting group based upon the predefined time period and geographic location parameters.

33. The system of claim 29 wherein the home location register includes further instructions to transmit an ANSI-41 compatible LocationRequest RETURN RESULT message to the mobile switching center, the ANSI-41 compatible LocationRequest REGION RESULT message containing a listing of each secondary directory number of the selected alerting group and corresponding routing and answering parameters for each secondary directory number of the selected alerting.

34. The system of claim 29, wherein the home location register further includes instructions to determine whether each secondary directory number is currently included within a selected alerting group based on a parameter associated with a selected time of day, a selected day of a week, or a selected holiday.

35. A method for subscriber control of membership in a multiple member termination group for a multiple leg telecommunication session, the method comprising:
   (a) receiving an incoming call leg designating a primary directory number;
   (b) determining a plurality of secondary directory numbers associated with the primary directory number;
   (c) determining whether each secondary directory number, of the plurality of secondary directory numbers, is currently incorporated within a selected alerting group based upon a determination of a geographic location of a mobile unit corresponding to the secondary directory number; and
   (d) routing each outgoing call leg associated with each secondary directory number currently incorporated within the selected alerting group.

36. A system for subscriber control of membership in a multiple member termination group for a multiple leg telecommunication session, the system comprising:
   a database having stored in a memory a plurality of secondary directory numbers associated with a primary directory number, wherein the database includes instructions to determine whether each secondary directory number, of the plurality of secondary directory numbers, is currently incorporated within a selected alerting group based upon a geographic location of a mobile unit corresponding to the secondary directory number; and,
   a switching center coupled to the database, the switching center further having an interface for receiving an incoming call leg designating the primary directory number and for routing each outgoing call leg associated with each secondary directory number currently incorporated the selected alerting group.

37. An apparatus for subscriber control of membership in a multiple member termination group for a multiple leg telecommunication session, the apparatus comprising:
   a network interface for reception of an incoming call leg designating a primary directory number and for transmission of a outgoing call leg;
   a memory having a plurality of secondary directory numbers associated with the primary directory number; and
   a processor coupled to the memory and the network interface, wherein the processor, when operative, includes program instructions to determine whether each secondary directory number, of the plurality of secondary directory numbers, is currently incorporated within a selected alerting group based upon a determination of a geographic location of a mobile unit corresponding to the secondary directory number, and to route each outgoing call leg associated with each secondary directory number of the selected alerting group.

38. A system for subscriber control of membership in a multiple member termination group for a multiple leg telecommunication session, the system comprising:
   a home location register having stored in a memory a plurality of secondary directory numbers associated with a primary directory number, wherein the home location register includes instructions to determine whether each secondary directory number, of the plurality of secondary directory numbers, is currently incorporated within a selected alerting group based upon a geographic location parameter for a mobile unit corresponding to the secondary directory number; and
   a mobile switching center coupled to the home location register, the mobile switching center further having an interface for receiving an incoming call leg designating the primary directory number and for routing each outgoing call leg associated with each secondary directory number currently incorporated within the selected alerting group.

* * * * *